United States Patent
Zhou et al.

(10) Patent No.: US 9,436,327 B2
(45) Date of Patent: Sep. 6, 2016

(54) EMBEDDED CAPACITIVE TOUCH DISPLAY PANEL AND EMBEDDED CAPACITIVE TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Xingyao Zhou, Shanghai (CN); Qijun Yao, Shanghai (CN); Hao Chen, Shanghai (CN); Jun Ma, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 141 days.

(21) Appl. No.: 14/284,279

(22) Filed: May 21, 2014

(65) Prior Publication Data
US 2015/0036064 A1 Feb. 5, 2015

(30) Foreign Application Priority Data

Jul. 30, 2013 (CN) .......................... 2013 1 0326797

(51) Int. Cl.
| | |
|---|---|
| G02F 1/1335 | (2006.01) |
| G06F 3/044 | (2006.01) |
| G06F 3/041 | (2006.01) |
| G02F 1/1333 | (2006.01) |

(52) U.S. Cl.
CPC ........... *G06F 3/044* (2013.01); *G02F 1/13338* (2013.01); *G02F 1/133514* (2013.01); *G06F 3/0412* (2013.01); *G02F 2201/124* (2013.01); *G06F 2203/04107* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2011/0007030 A1* | 1/2011 | Mo | G06F 3/044 345/174 |
| 2012/0169631 A1* | 7/2012 | Ahn | G06F 3/044 345/173 |

* cited by examiner

*Primary Examiner* — Richard Kim
(74) *Attorney, Agent, or Firm* — Alston & Bird LLP

(57) ABSTRACT

An embedded capacitive touch display panel is disclosed. The display panel includes a first transparent substrate, and a grid-shaped metal conductive layer formed on the first transparent substrate. The grid-shaped metal conductive layer includes first metal electrodes extending in a first direction, and second metal electrodes extending in a direction intersecting the first direction. Each of the second metal electrodes is divided into multiple sections by openings, through which the first metal electrodes extend. In addition, the first and second metal electrodes are separated from each other by gaps. The display panel also includes a color filter layer, including a plurality of red, green, and blue color resist units, and a green color resist bar. The gaps include a first gap part, parallel to the green color resist bar, where the first gap part is not overlapped by the green color resist bar.

11 Claims, 7 Drawing Sheets

---Prior Art---

---Prior Art---

EMBEDDED CAPACITIVE TOUCH DISPLAY PANEL AND EMBEDDED CAPACITIVE TOUCH DISPLAY DEVICE

CROSS REFERENCE TO RELATED APPLICATIONS

This application claims the benefit of priority to Chinese Patent Application No. 201310326797.X, filed with the Chinese Patent Office on Jul. 30, 2013 and entitled "EMBEDDED CAPACITIVE TOUCH DISPLAY PANEL AND EMBEDDED CAPACITIVE TOUCH DISPLAY DEVICE", the content of which is incorporated herein by reference in its entirety.

TECHNICAL FIELD

The present invention relates to the field of embedded capacitive touch display, and particularly relates to an embedded capacitive touch display panel and an embedded capacitive touch display device including the embedded capacitive touch display panel.

BACKGROUND OF THE INVENTION

An embedded touch screen does not need a traditional externally-mounted touch screen, is formed by designing an integrated touch electrode structure at a color filter (CF) side, and can realize the need of lightening and thinning of a display panel. Generally, a touch electrode structure is designed to be provided with longitudinal driving electrodes and transversal sensing electrodes, wherein the sensing electrodes at both sides of each driving electrode are connected by a crossing bridge. Certainly, the positions and the connection modes of the driving electrodes and the sensing electrodes are not limited, the sensing electrodes can be longitudinal and the driving electrodes can be transversal in an electrode structure design, and the driving electrodes at both sides of each sensing electrode are connected by a metal crossing bridge. In addition, patterns of touch electrodes can be various, wherein rhombus is the most basic pattern design in the prior art, but different electrode pattern designs can be selected for realizing different functions.

The specific structure of a liquid crystal display screen of an embedded touch screen in the prior art is as shown in FIG. 1, the liquid crystal display screen mainly includes an upper substrate 12 (namely, color filter (CF) side), a lower substrate 11 (TFT side), and a liquid crystal layer 10 located between the upper substrate 12 and the lower substrate 11, wherein the CF side is integrated with a black matrix 13 (BM), a touch electrode layer 14, a color filter layer 15 (which mainly includes a red color resist (R), a green color resist (G) and a blue color resist (B)), a metal crossing bridge layer 16 (which can also be a transparent oxide crossing bridge) and an over coat layer 17 (OC), respectively. The lower substrate 11 side is mainly integrated with a TFT array structure layer 19 and a transparent pixel electrode (ITO) layer 18 on the TFT array.

As shown in FIG. 2 and FIG. 3, FIG. 3 is an enlarged view of a dotted line box (part A) in FIG. 2, the metal touch electrode layer 14 includes sensing electrodes 141 and driving electrodes 142 which are mutually insulated and located on the same layer, in order to insulate the sensing electrodes 141 from the driving electrodes 142, the sensing electrodes and the driving electrodes are separated to form gaps 1, so as to achieve the insulating purpose. In addition, the metal touch electrode layer 14 is grid-shaped and shielded by the black matrix 13. Generally, the formed gaps are located on the color filter layer, and randomly located on the red color resist (R), the green color resist (G) or the blue color resist (B). As shown in FIG. 1, when a liquid crystal display works, because a light L emitted by a backlight module is irradiated on the metal touch electrode layer 14, the light L is partly reflected on the channels of TFTs on the TFT array structure layer of the lower substrate 11 by the metal touch electrode layer 14 to cause an electricity leakage phenomenon of the TFTs. However, at the gaps 1, due to the absence of the metal touch electrode layer 14, when the light L of a backlight source is irradiated, a light-reflecting phenomenon is very weak, and the reason for this is that there is no any direct reflecting light in a vertical direction, the reflecting phenomenon of the light at an adjacent position in a slanting direction is only in a very small angle range, and the slanting reflected light has no obvious influence on the TFTs which are just opposite to the gaps 1, so that a corresponding TFT off-state current is low. All the TFTs corresponding to the color resists at the gaps 1 are not vertically irradiated by the reflected light, the display effect of the TFTs at the gaps are different from the display effect at non-gap parts, and when the intensity of the backlight source is increased or the TFT off-state current is increased, the patterns of the gaps between the sensing electrodes and the driving electrodes are highlighted on the liquid crystal display screen.

BRIEF SUMMARY OF THE INVENTION

One inventive aspect is an embedded capacitive touch display panel. The display panel includes a first transparent substrate, and a grid-shaped metal conductive layer formed on the first transparent substrate. The grid-shaped metal conductive layer includes a plurality of first metal electrodes extending in a first direction, and a plurality of second metal electrodes extending in a direction which intersects the first direction. Each of the second metal electrodes is divided into multiple sections by a plurality of openings, through which the first metal electrodes extend. In addition, the first metal electrodes and the second metal electrodes are separated from each other by a plurality of gaps. The display panel also includes a color filter layer, including a plurality of red color resist units, a plurality of green color resist units, a plurality of blue color resist units, and a green color resist bar, including a plurality of adjacent green color resist units. The gaps include a first gap part, parallel to the green color resist bar, and the first gap part is not overlapped by the green color resist bar.

BRIEF DESCRIPTION OF THE DRAWINGS

In order to describe the technical solutions in the embodiments of the present invention more clearly, the drawings which are needed in the description of the embodiments will be briefly introduced as follows, obviously, the drawings in the following description are only some of the embodiments of the present invention, and for those of ordinarily skilled in the art, other drawings can also be obtained in accordance with these drawings without any creative effort.

DETAILED DESCRIPTION OF THE PREFERRED EMBODIMENTS

Figure 1:
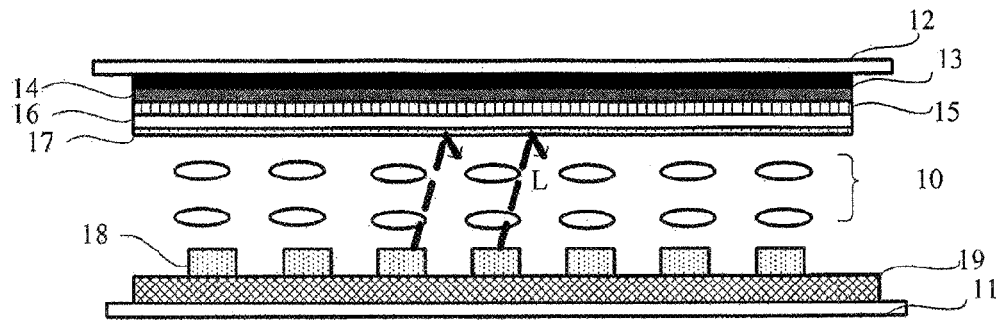
FIG. 1 is a structural schematic view of an embedded touch liquid crystal display screen in the prior art.
Figure 2:
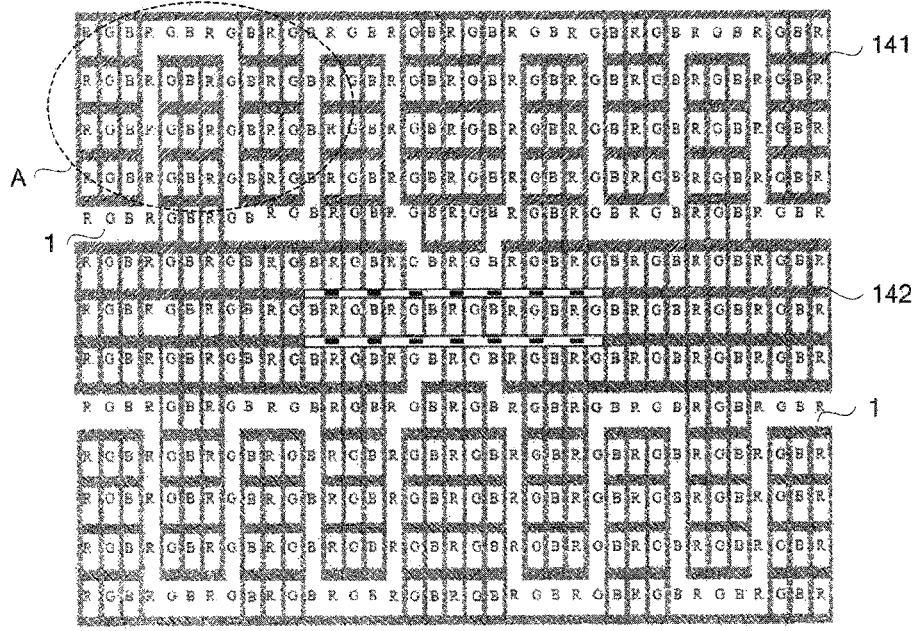
FIG. 2 is a pattern of gaps between sensing electrodes and driving electrodes of the embedded touch liquid crystal display screen in the prior art.

The technical solutions in the embodiments of the present invention are clearly and completely described in combination with the drawing in the embodiments of the present invention, obviously, the described embodiments are only part of the embodiments of the present invention, rather than all the embodiments. All the other embodiments, obtained by those of ordinarily skilled in the art in accordance with the embodiments in the invention without any creative effort, fall into the protection scope of the present invention.

The present invention discloses an embedded capacitive touch display panel and an embedded capacitive touch display device, wherein the positions of gaps between sensing electrodes and driving electrodes in the display panel are set to keep away from a green color resist bar. Thus the visible defects of patterns of metal touch electrodes are improved, and the display performance of the embedded touch screen is improved on the premise of causing no influence on touch effect.

In the embedded touch screen, in order to improve the visible defects of the patterns of the metal touch electrodes and improve the display quality of a picture of an LCD, in the present invention, from the point of optimally designing the positions where the sensing electrodes and the driving electrodes are separated to form gaps, the positions of the gaps are set to keep away from the green color resist bar, and the gaps can be formed on a red color resist bar and/or a blue color resist bar. Because the red color resist and the blue color resist are relatively low in penetration rate and cannot be easily identified by human eyes, the disadvantageous phenomenon that the human-eye can see the patterns of the touch electrodes can be effectively avoided under common customer backlight intensity specifications. Wherein in a display brightness L, the contribution rate of each color resist is shown in the following formula:

$$L=1.0000R+4.5907G+0.0601B$$

wherein R represents the red color resist, G presents the green color resist, and B represents the blue color resist. As shown in the formula aforementioned, for brightness, the contribution of the green color resist is far greater than the contribution of the red color resist and the contribution of the blue color resist, and the green color resist is brighter compared with the other adjacent color resists and easy to be sensed by human eyes during display.

Figure 3:
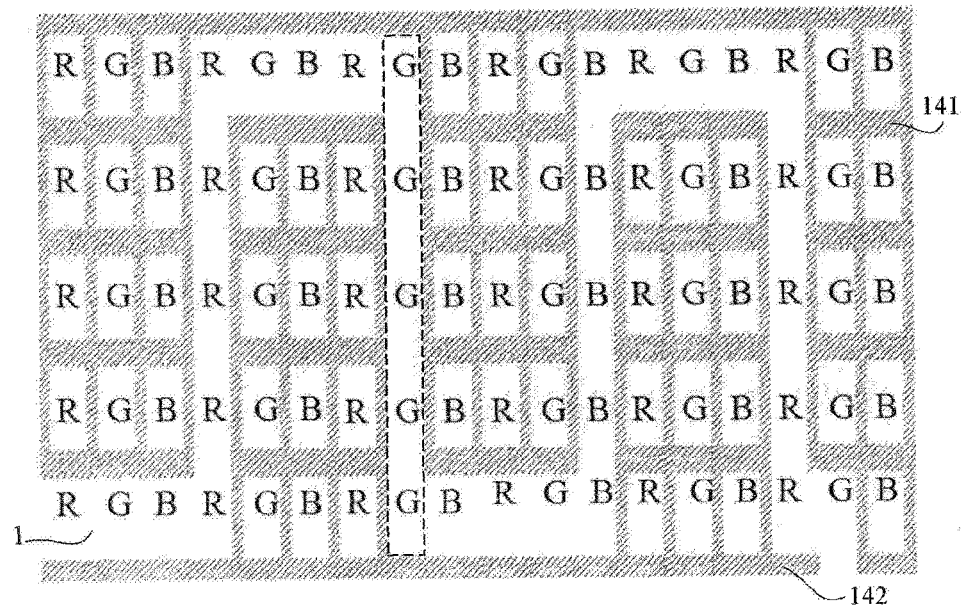
FIG. 3 is a partial enlarged view of part A in FIG. 2.
Figure 4:
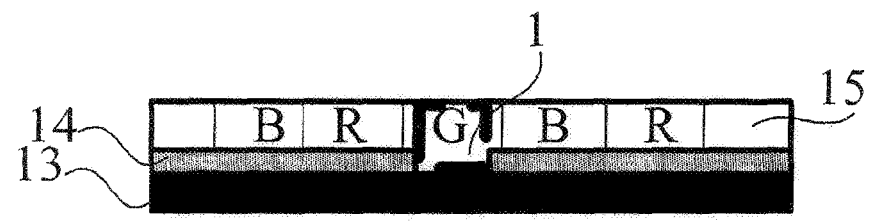
FIG. 4 is a position relationship between the gaps between the sensing electrodes and the driving electrodes, and color resists in the embedded touch liquid crystal display screen in the prior art.

For the green color resist G with a high penetration rate, if the positions of the gaps 1 correspond to the position of the green color resist bar G on the color filter layer, for example, the gaps 1 are in the position of the green color resist G as shown by the dotted line box in FIG. 3 and FIG. 4, the phenomenon is more obvious. When the intensity of the backlight source is increased or the TFT off-state current is increased, the pattern of the gaps between the sensing electrodes and the driving electrodes is highlighted on the liquid crystal display screen, in particular, when the positions of the gaps correspond to the positions of the green color resists, the phenomenon is especially obvious, and the display quality of the picture is seriously reduced.

An Embodiment

Figure 5:
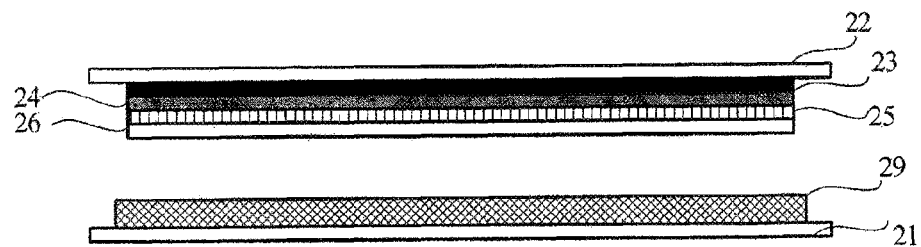
FIG. 5 is a structural schematic view of an embedded capacitive touch display panel in an embodiment.

As shown in FIG. 5 to FIG. 14, the present invention discloses an embedded capacitive touch display panel, which includes: a first transparent substrate 22, a grid-shaped metal conductive layer 24 formed on the first transparent substrate 22, a black matrix layer 23 formed between the first transparent substrate 22 and the grid-shaped metal conductive layer 24 which is shielded by the black matrix layer 23, a second substrate 21 arranged opposite to the first transparent substrate 22, and a pixel element array (not shown in the figures) formed on the second substrate 21, wherein each pixel element is correspondingly provided with a TFT (not shown in the figures); a light-shading structure is not provided at one side of each TFT away from the second substrate 21, because the working performance of the TFTs is influenced due to the existence of parasitic capacitance caused by arranging the light-shading structure, therefore, a light-shading structure will not provided at one side of each TFT away from the second substrate 21, and the multiple TFTs on the second substrate 21 form a TFT structure layer 29, as shown in FIG. 5.

Figure 6:
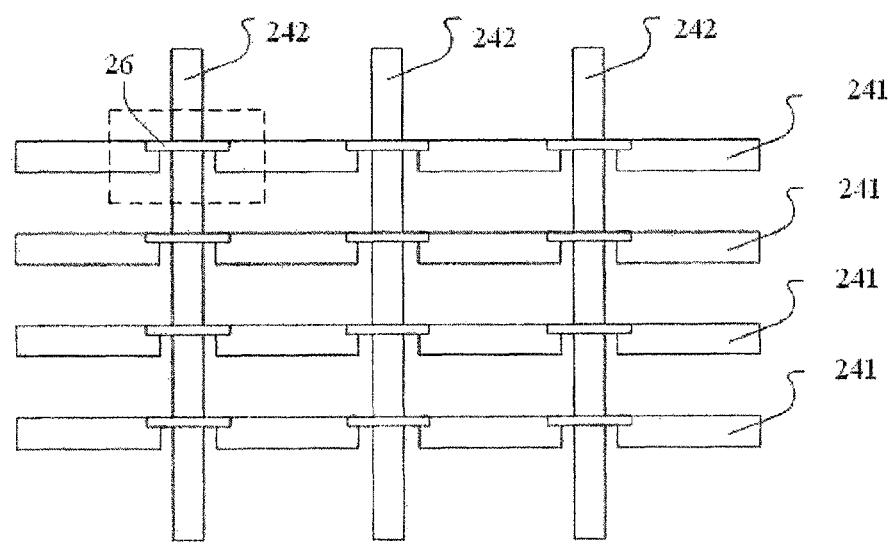
FIG. 6 is a position relationship between sensing electrodes and driving electrodes in the embedded capacitive touch display panel in an embodiment.
Figure 7:
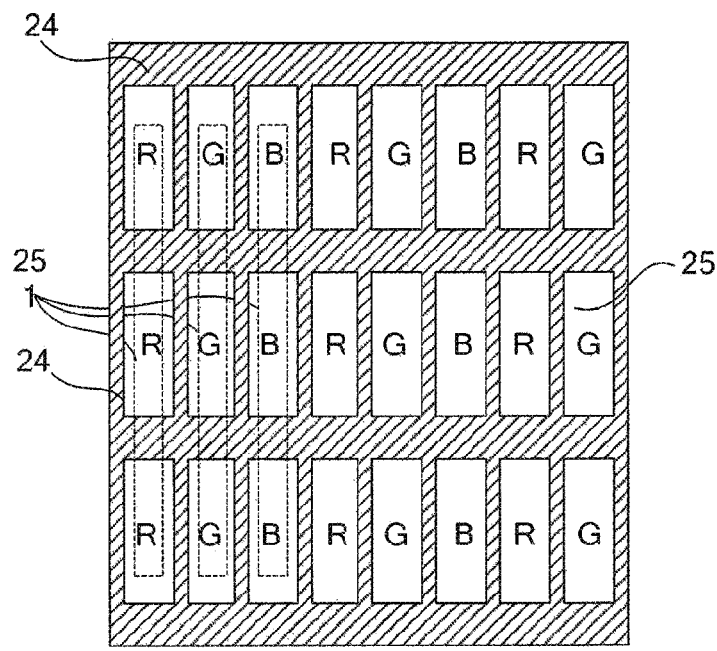
FIG. 7 is a position relationship between a color filter layer and a grid-shaped metal conductive layer in the embedded capacitive touch display panel in an embodiment.
Figure 8:
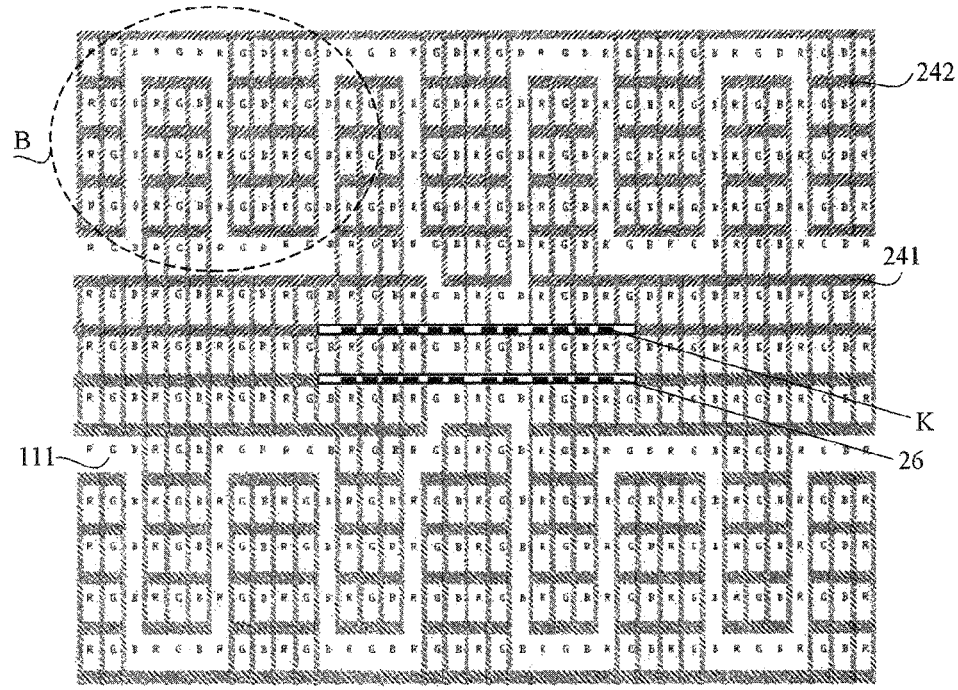
FIG. 8 is a pattern of gaps between the sensing electrodes and the driving electrodes in the embedded capacitive touch display panel in an embodiment.

As shown in FIG. 6 to FIG. 9, FIG. 9 is a partial enlarged view of part B in FIG. 8, the grid-shaped metal conductive layer 24 includes multiple first metal electrodes 242 and multiple second metal electrodes 241 crossed with the multiple first metal electrodes 242, and each of the second metal electrodes 241 is divided into multiple sections by the multiple first metal electrodes 242; and the first metal electrodes 242 and the second metal electrodes 241 are separated from each other and form gaps 111, as shown in FIG. 6, wherein the first metal electrodes 242 are sensing electrodes, and the second metal electrodes 241 are driving electrodes.

As shown in FIG. 5 and FIG. 7, the embedded capacitive touch display panel further includes a color filter layer 25, wherein the color filter layer 25 includes red color resist units R, green color resist units G and blue color resist units B, and the color resist units with the same color are arrayed to form a color resist bar 251. Wherein the color resist bars 251 include a red color resist bar R, a green color resist bar G and a blue color resist bar B, the three color resist bars are mutually parallel or substantially parallel. In addition, each pixel element corresponds to one color resist unit, a part of the color resist units are surrounded by the grid-shaped metal conductive layer 24, and the TFTs in the pixel elements corresponding to the color resist units surrounded by the grid-shaped metal conductive layer 24 are shielded by the grid-shaped metal conductive layer 24. The other part of the color resist units are located at the gaps 111 formed by separation of the first metal electrodes 242 and the second metal electrodes 241, and are not surrounded by the grid-shaped metal conductive layer 24.

Figure 9:
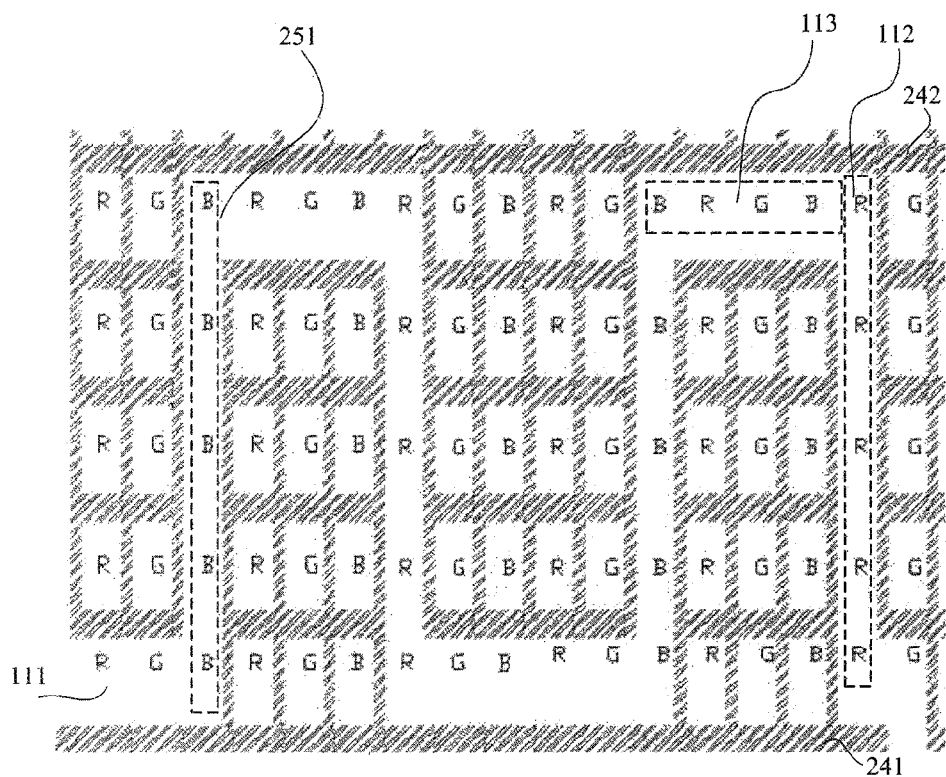
FIG. 9 is a partial enlarged view of part B in FIG. 8.
Figure 10:
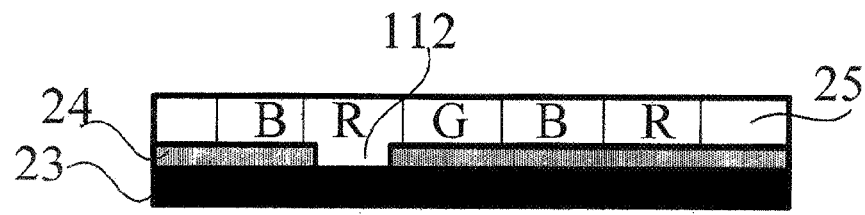
FIG. 10 is a position relationship between the gaps and color resists in the embedded capacitive touch display panel in an embodiment.
Figure 11:
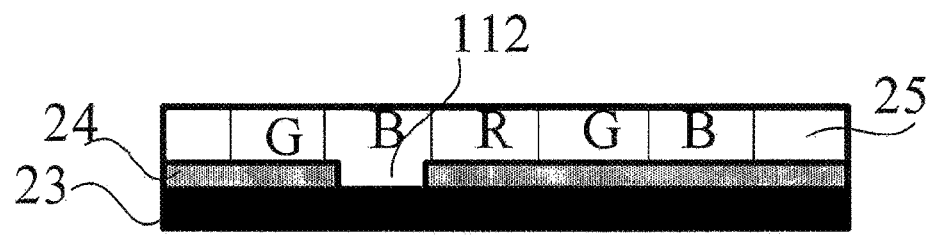
FIG. 11 is another position relationship between the gaps and the color resists in the embedded capacitive touch display panel in an embodiment.
Figure 12:
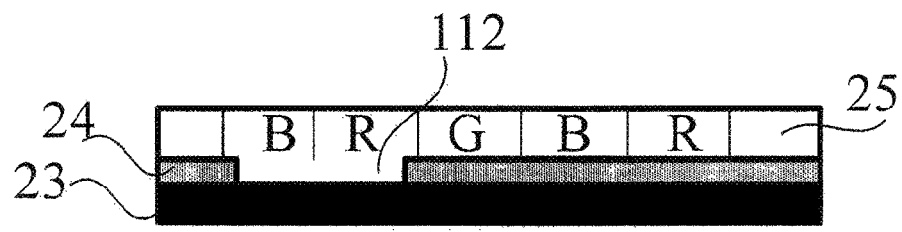
FIG. 12 is still another position relationship between the gaps and the color resists in the embedded capacitive touch display panel in an embodiment.
Figure 13:
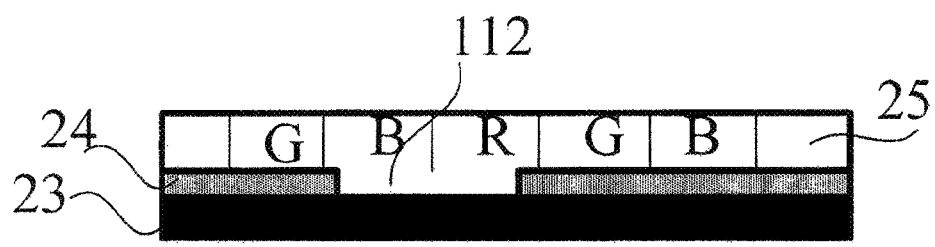
FIG. 13 is still another position relationship between the gaps and the color resists in the embedded capacitive touch display panel in an embodiment.

As shown in FIG. 9, the gaps 111 include a first gap part 112, the first gap part 112 is parallel to the color resist bars 251, and the first gap part 112 is not overlapped with the green color resist bar G, as shown in cross-sectional views of FIG. 10 and FIG. 11. In other words, the first gap part 112 parallel to the green color resist bar is kept away from the green color resist bar, or the green color resist bar parallel to the first gap part 112 is not located in the first gap part 112. As shown in FIG. 10, the first gap part 112 is arranged corresponding to the red color resist bar R; in another implementation of this embodiment, as shown in FIG. 11, the first gap part 112 is arranged corresponding to the blue color resist bar B. In still another implementation of this embodiment, as shown in FIG. 12 and FIG. 13, the first gap part 112 is arranged corresponding to the blue color resist bar B and the red color resist bar R. In addition, the gaps 111 further include a second gap part 113, and the second gap part 113 is perpendicular to the color resist bars 251, as shown in FIG. 9.

Figure 14:
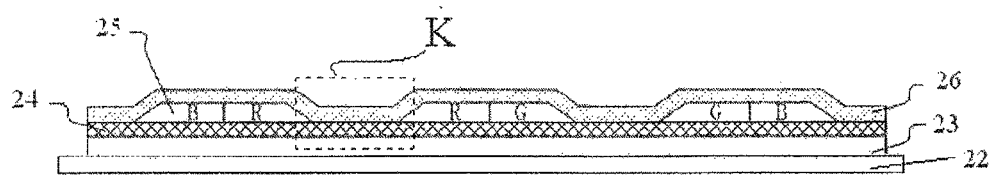
FIG. 14 is a structural schematic view of a first transparent substrate in the embedded capacitive touch display panel in an embodiment.

As shown in FIG. 5, FIG. 6 and FIG. 14, the touch display panel further includes a conductive bridging layer 26, the multiple sections of the second metal electrode 241 are connected together by the conductive bridging layer 26, and the conductive bridging layer 26 is made of a metal material or a transparent conductive material. As shown in FIG. 14, the color filter layer 25 is arranged between the grid-shaped metal conductive layer 24 and the conductive bridging layer 26, the color filter layer includes multiple via holes K, and the multiple sections of the second metal electrode 241 are connected together by the conductive bridging layer 26 through the via holes K; and the color filter layer 25 is made of an insulating and non-conducting material.

Another Embodiment

Figure 15:
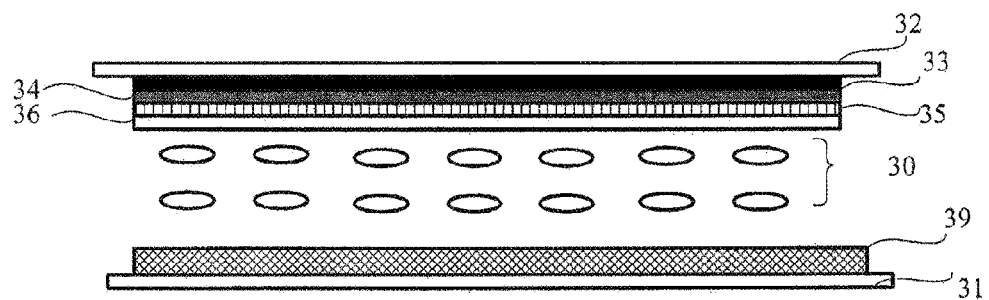
FIG. 15 is a structural schematic view of an embedded touch screen liquid crystal display in another embodiment.

This embodiment is based on the embodiment aforementioned, and the embedded capacitive touch display panel may be an embedded capacitive touch liquid crystal display. As shown in FIG. 15, the embedded capacitive touch liquid crystal display includes: a first transparent substrate 32, a grid-shaped metal conductive layer 34 formed on the first transparent substrate 32, a black matrix layer 33 formed between the first transparent substrate 32 and the grid-shaped metal conductive layer 34 which is shielded by the black matrix layer 33, a conductive bridging layer 36 located on the grid-shaped metal conductive layer 34, a color filter layer 35 located between the grid-shaped metal conductive layer 34 and the conductive bridging layer 36, a second substrate 31 arranged opposite to the first transparent substrate 32, and a pixel element array (not shown in the figure) formed on the second substrate 31, wherein each pixel element is correspondingly provided with a TFT (not shown in the figure), a light-shading structure is not provided at one side of each TFT away from the second substrate 31, and the multiple TFTs on the second substrate 31 form a TFT structure layer 39; and the embedded capacitive touch liquid crystal display further includes a liquid crystal layer 30 sandwiched between the first transparent substrate 32 and the second substrate 31. The positions of the gaps between the sensing electrodes and the driving electrodes in the touch structure in the liquid crystal display device are set to keep away from the green color resist bar. Thus the visible defects of the patterns of the metal touch electrodes are improved, and the display performance of the embedded capacitive touch liquid crystal display is improved on the premise of causing no influence on touch effect.

In addition, the embedded capacitive touch display panel in the embodiment may also be an embedded capacitive touch organic light-emitting display panel or an embedded capacitive touch color electronic paper.

Another Embodiment

The embodiment of the present invention provides an embedded capacitive touch display device, which includes one of the embedded capacitive touch display panels in the embodiments aforementioned.

Each part in the specification is described in a progressive mode, what is highlighted in each part is different from that in other parts, and for the same or similar parts between all the parts, reference could be made to each other.

For the above-mentioned illustration of the disclosed embodiments, those skilled in the art may realize or use the present invention. Multiple modifications of these embodiments are obvious for those skilled in the art, and general principles defined herein may be realized in other embodiments without departing from the spirit or scope of the present invention. Accordingly, the present invention will not be limited to the embodiments shown herein, but accords with the widest scope consistent with the principles and novel characteristics disclosed herein.

What is claimed is:

1. An embedded capacitive touch display panel, comprising:
    a first transparent substrate;
    a grid-shaped metal conductive layer formed on the first transparent substrate, wherein the grid-shaped metal conductive layer comprises:
        a plurality of first metal electrodes extending in a first direction, and
        a plurality of second metal electrodes extending in a direction which intersects the first direction,
        wherein each of the second metal electrodes is divided into multiple sections by a plurality of openings, through which the first metal electrodes extend, and
        wherein the first metal electrodes and the second metal electrodes are separated from each other by a plurality of gaps; and
    a color filter layer, comprising:
        a plurality of red color resist units,
        a plurality of green color resist units,
        a plurality of blue color resist units, and
        a green color resist bar, comprising a plurality of adjacent green color resist units
    wherein the gaps comprise a first gap part, parallel to the green color resist bar, and wherein the first gap part is not overlapped by the green color resist bar.

2. The embedded capacitive touch display panel of claim 1, wherein the color filter layer further comprises a red color resist bar and a blue color resist bar, wherein the green color resist bar, the red color resist bar, and the blue color resist bar are substantially parallel.

3. The embedded capacitive touch display panel of claim 1, wherein the gaps further comprise a second gap part, wherein the second gap part is substantially perpendicular to the green color resist bar, the red color resist bar, and the blue color resist bar.

4. The embedded capacitive touch display panel of claim 1, further comprising:
   a second substrate arranged opposite to the first transparent substrate; and
   a pixel element array formed on the second substrate, wherein each pixel element of the pixel element array is correspondingly provided with a TFT, wherein a light-shading structure is not provided at one side of each TFT away from the second substrate.

5. The embedded capacitive touch display panel of claim 4, wherein each pixel element corresponds to one color resist unit, wherein a portion of the color resist units are surrounded by the grid-shaped metal conductive layer, and wherein the TFTs in the pixel elements surrounded by the grid-shaped metal conductive layer are shielded by the grid-shaped metal conductive layer.

6. The embedded capacitive touch display panel of claim 1, further comprising:
   a conductive bridging layer, wherein the sections of the second metal electrode are connected together by the conductive bridging layer.

7. The embedded capacitive touch display panel of claim 6, wherein the color filter layer is arranged between the grid-shaped metal conductive layer and the conductive bridging layer, wherein the color filter layer comprises a plurality of via holes, and wherein the sections of the second metal electrode are connected together by the conductive bridging layer through the via holes.

8. The embedded capacitive touch display panel of claim 1, wherein at least one of:
   a) the first gap part is arranged corresponding to the red color resist bar; and
   b) the first gap part is arranged corresponding to the blue color resist bar.

9. The embedded capacitive touch display panel of claim 1, further comprising a black matrix layer formed on the first transparent substrate, wherein the grid-shaped metal conductive layer is shielded by the black matrix layer.

10. The embedded capacitive touch display panel of claim 1, wherein one of:
   a) the first metal electrodes are sensing electrodes, and the second metal electrodes are driving electrodes; and
   b) the first metal electrodes are driving electrodes, and the second metal electrodes are sensing electrodes.

11. An embedded capacitive touch display device, comprising the embedded capacitive touch display panel of claim 1.

* * * * *